United States Patent
Fujita (10) Patent No.: US 12,319,095 B2
(45) Date of Patent: Jun. 3, 2025

(54) TIRE

(71) Applicant: BRIDGESTONE CORPORATION, Tokyo (JP)

(72) Inventor: Shungo Fujita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 219 days.

(21) Appl. No.: 17/634,133

(22) PCT Filed: Aug. 17, 2020

(86) PCT No.: PCT/JP2020/030930
§ 371 (c)(1),
(2) Date: Feb. 9, 2022

(87) PCT Pub. No.: WO2021/033653
PCT Pub. Date: Feb. 25, 2021

(65) Prior Publication Data
US 2022/0355621 A1 Nov. 10, 2022

(30) Foreign Application Priority Data
Aug. 21, 2019 (JP) .................. 2019-150839

(51) Int. Cl.
*B60C 11/03* (2006.01)
*B60C 11/12* (2006.01)
*B60C 11/13* (2006.01)

(52) U.S. Cl.
CPC ...... *B60C 11/0306* (2013.01); *B60C 11/0304* (2013.01); *B60C 11/032* (2013.01);
(Continued)

(58) Field of Classification Search
CPC ............. B60C 11/1392; B60C 11/1384; B60C 11/0306; B60C 11/0309; B60C 11/0304; B60C 2011/0381; B60C 2011/0383
See application file for complete search history.

(56) References Cited

U.S. PATENT DOCUMENTS

2010/0000642 A1\* 1/2010 Watabe .................. B60C 11/12
152/209.15
2015/0231929 A1 8/2015 Nagahara
(Continued)

FOREIGN PATENT DOCUMENTS

CN 102310723 A 1/2012
EP 3925795 A1 12/2021
(Continued)

OTHER PUBLICATIONS

Jul. 19, 2023 Extended European Search Report issued in European Patent Application No. 20853744.9.
Oct. 20, 2020 International Search Report issued in International Patent Application No. PCT/JP2020/030930.
Mar. 30, 2023 Search Report issued in Chinese Patent Application No. 202080057327.6.

*Primary Examiner* — Cedrick S Williams
*Assistant Examiner* — Thomas Frank Schneider
(74) *Attorney, Agent, or Firm* — Oliff PLC (57) ABSTRACT

A first lateral groove and a second lateral groove are formed in a pneumatic tire. A first inclined portion is formed on one side of the first lateral groove in the tire circumferential direction, and a second inclined portion is formed on the other side of the second lateral groove in the tire circumferential direction. The first inclined portion is inclined from tire radial direction outside to tire radial direction inside by chamfering the end of one side circumferential block in the tire circumferential direction. The second inclined portion is inclined from tire radial direction outside to tire radial direction inside by chamfering the end of the other side circumferential block in the tire circumferential direction. The first inclined portion crosses the circumferential block and communicates with the circumferential groove. One end portion of the second inclined portion in the tire width direction terminates in the circumferential direction block.

12 Claims, 7 Drawing Sheets

(52) U.S. Cl.
CPC ........ *B60C 11/124* (2013.01); *B60C 11/1392* (2013.01); *B60C 2011/0341* (2013.01); *B60C 2011/0358* (2013.01); *B60C 2011/0383* (2013.01); *B60C 2011/1209* (2013.01); *B60C 2011/1254* (2013.01)

(56) References Cited

U.S. PATENT DOCUMENTS

| | | | |
|---|---|---|---|
| 2017/0253089 A1 | 9/2017 | Hayashi | |
| 2017/0368888 A1* | 12/2017 | Wakasugi | B60C 11/1263 |
| 2018/0015788 A1 | 1/2018 | Hayashi | |
| 2019/0283505 A1 | 9/2019 | Kuriyama | |
| 2020/0164693 A1 | 5/2020 | Hayashi | |
| 2020/0369089 A1* | 11/2020 | Speziari | B60C 11/0304 |

FOREIGN PATENT DOCUMENTS

| | | | | |
|---|---|---|---|---|
| JP | 2012-121542 A | 6/2012 | | |
| JP | 2015-151023 A | 8/2015 | | |
| JP | 2016-49879 A | 4/2016 | | |
| JP | 2016-141157 A | 8/2016 | | |
| JP | 2018-12372 A | 1/2018 | | |
| JP | 6441096 B2 * | 12/2018 | | |
| JP | 2020-131801 A | 8/2020 | | |
| WO | 2016/125814 A1 | 8/2016 | | |
| WO | 2018/225304 A1 | 12/2018 | | |
| WO | WO-2019111089 A1 * | 6/2019 | ......... | B60C 11/0302 |

\* cited by examiner

TIRE

TECHNICAL FIELD

The present invention relates to a tire having a plurality of circumferential blocks, and lateral grooves extending in the tire width direction are formed in the circumferential blocks.

BACKGROUND ART

Conventionally, in a pneumatic tire (hereinafter, tire) for a passenger automobile (including an SUV (RV) and a minivan), in order to improve a steering stability, a tread pattern is known in which the number of lateral grooves formed in an inside shoulder block is larger than the number of lateral grooves formed in an outside shoulder block when mounted to the vehicle (see Patent Literature 1).

According to such a tire, since the rigidity of the outside shoulder block when mounted to the vehicle is relatively high, the wet performance (draining performance) can be secured while improving steering stability at turning in particular.

CITATION LIST

Patent Literature

[Patent Literature 1] Japanese Unexamined Patent Application Publication No. 2015-151023

SUMMARY OF INVENTION

While the tire described above can improve steering stability, there is still room for further improvement in wet performance, particularly in braking performance on wet road surfaces.

As a measure for improving braking performance on a wet road surface, it is known that hysteresis loss of the tread rubber is increased and deformation energy of the tread rubber is consumed as braking force. However, since the increase of hysteresis loss also increases rolling resistance, it is not preferable from recent low fuel consumption oriented viewpoint.

Accordingly, an object of the present invention is to provide a tire capable of achieving both steering stability and wet performance, particularly braking performance on a wet road surface, while suppressing rolling resistance.

One aspect of the present invention is a tire (pneumatic tire 10) having a plurality of circumferential blocks (circumferential block 41 to circumferential block 43) divided by a plurality of circumferential grooves (circumferential groove 31 to circumferential groove 34) extending in the tire circumferential direction. The circumferential block forms a first lateral groove (first lateral groove 110) extending in the tire width direction from outside when mounted, and a second lateral groove (second lateral groove 160) extending in the tire width direction from inside when mounted. A first inclined portion (first inclined portion 111) is formed on one side of the first lateral groove in the tire circumferential direction, and a second inclined portion (second inclined portion 161) is formed on other side of the second lateral groove in the tire circumferential direction. The first inclined portion is inclined from tire radial direction outside to tire radial direction inside by chamfering an end portion on one side in the tire circumferential direction of the circumferential block, the second inclined portion is inclined from tire radial direction outside to tire radial direction inside by chamfering an end portion on other side in the tire circumferential direction of the circumferential block.

DESCRIPTION OF EMBODIMENTS

Embodiments will be described below with reference to the drawings. Note that the same functions and structures are denoted by the same or similar reference numerals, and the description thereof is omitted as appropriate.

(1) Overall Schematic Configuration of the Tire

Figure 1:
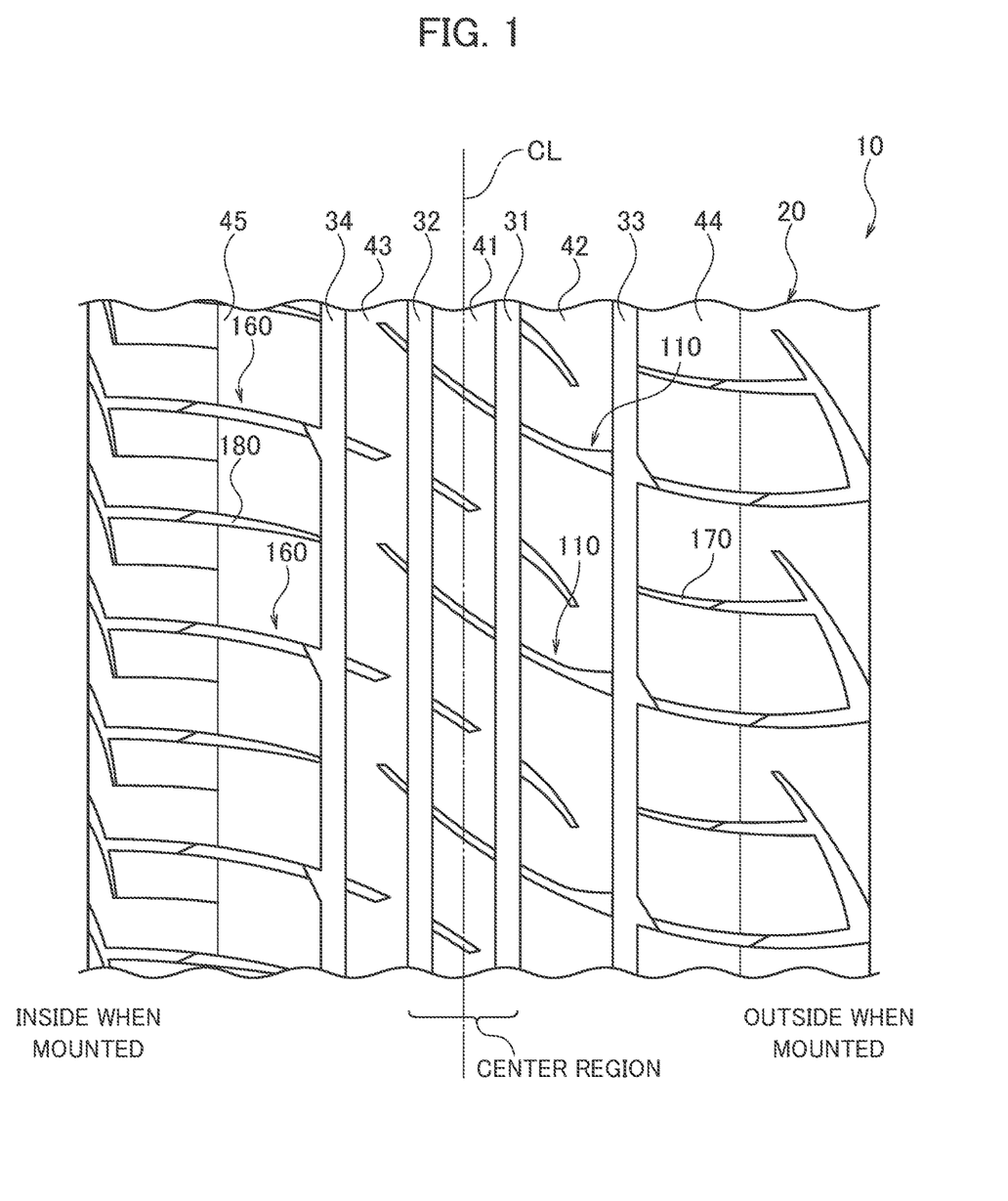
FIG. 1 is a partial plan view of a tread of a pneumatic tire 10.

FIG. 1 is a partial plan view of a tread of a pneumatic tire 10 according to the present embodiment. As shown in FIG. 1, the pneumatic tire 10 includes a tread 20 which is a portion in contact with the road surface.

A plurality of circumferential grooves extending in the tire circumferential direction are formed in the pneumatic tire 10. Specifically, a circumferential groove 31 to a circumferential groove 34 are formed in the pneumatic tire 10.

The pneumatic tire 10 includes a plurality of circumferential blocks divided by a plurality of circumferential grooves (circumferential groove 31 to circumferential groove 34). Specifically, the pneumatic tire 10 includes a circumferential block 41 to a circumferential block 43.

In this embodiment, the pneumatic tire 10 can be suitably used mainly for a passenger vehicle. However, the type of vehicle (automobile) to which the pneumatic tire 10 is mounted is not particularly limited. The pneumatic tire 10 preferably has a predetermined class or higher (for example, AA) for a rolling resistance labeling system defined by Japan Automobile Tire Manufacturers Association (JATMA).

Mounting positions (vehicle inside and vehicle outside) of the pneumatic tire 10 are designated. In the pneumatic tire 10, "OUTSIDE" or the like is generally indicated on the sidewall (not shown) of outside when the pneumatic tire 10 is mounted to the vehicle.

The circumferential block 41 is provided at a position including a tire equatorial line CL. The circumferential block 41 is divided by the circumferential groove 31 and the circumferential groove 32.

The circumferential block 42 is located in outside of the circumferential block 41 when mounted to the vehicle. The circumferential block 42 is divided by the circumferential groove 31 and the circumferential groove 33.

The circumferential block 43 is located in inside of the circumferential block 41 when mounted to the vehicle. The circumferential block 43 is divided by the circumferential groove 32 and the circumferential groove 34.

A shoulder block 44 is provided in outside of the circumferential groove 33 when mounted to the vehicle. A shoulder block 45 is provided in inside of the circumferential groove 34 when mounted to the vehicle.

A plurality of lateral grooves (which may be referred to as tire width grooves) extending in the tire width direction are formed in the circumferential block 41 to the circumferential block 43, a shoulder block 44 and a shoulder block 45. In the present embodiment, the lateral groove (tire width direction groove) means that the lateral groove (tire width direction groove) extends in the tire width direction and has a crossing angle with the tire equatorial line CL of 45 degrees or more.

A first lateral groove 110 extends in the tire width direction from outside when mounted to the vehicle. The first lateral groove 110 is formed over the circumferential block 41 to the circumferential block 43 and the shoulder block 44.

A second lateral groove 160 extends in the tire width direction from inside when mounted to the vehicle. The second lateral groove 160 is formed over the circumferential block 41 to the circumferential block 43 and the shoulder block 45.

The first lateral groove 110 is curved to convex to one side (lower side in FIG. 1) in the tire circumferential direction. On the other hand, the second lateral groove 160 is curved to convex to the other side (the upper side in FIG. 1) in the tire circumferential direction.

As shown in FIG. 1, the first lateral groove 110 and the second lateral groove 160 extend along the tire width direction in a tread surface view, and have a gentle arc shape.

The first lateral groove 110 and the second lateral groove 160 extend up to the center region. The center region includes the tire equatorial line CL, and in the present embodiment, the center region includes the circumferential block 41, the circumferential groove 31, and the circumferential groove 32.

The first lateral groove 110 extends from the shoulder block 44 to the circumferential block 41 and further to the circumferential block 43. The second lateral groove 160 extends from the shoulder block 45 to the circumferential block 41 and further to the circumferential block 42.

The first lateral grooves 110 and the second lateral grooves 160 are alternately formed in the tire circumferential direction. Specifically, the first lateral grooves 110 and the second lateral grooves 160 are formed alternately in the tire circumferential direction in the region of the circumferential block 41 to the circumferential block 43.

In this embodiment, a first lateral groove 170 is further formed in the shoulder block 44. That is, in this embodiment, the first lateral groove extending in the tire width direction is also formed in the shoulder block 44 (outside shoulder block) positioned outside when mounted to the vehicle.

Similarly, a second lateral groove 180 is further formed in the shoulder block 45. That is, in this embodiment, the second lateral groove extending in the tire width direction is also formed in the shoulder block 45 (outside shoulder block) positioned inside when mounted to the vehicle.

(2) Shape of the First Lateral Groove and the Second Lateral Groove

Next, the shapes of the first lateral groove and the second lateral groove, particularly the shapes of the first lateral groove 110 and the second lateral groove 160, will be described with reference to FIGS. 2 to 4. The shapes of the first lateral groove 170 and the second lateral groove 180 formed in the shoulder block will also be described.

Figure 2:
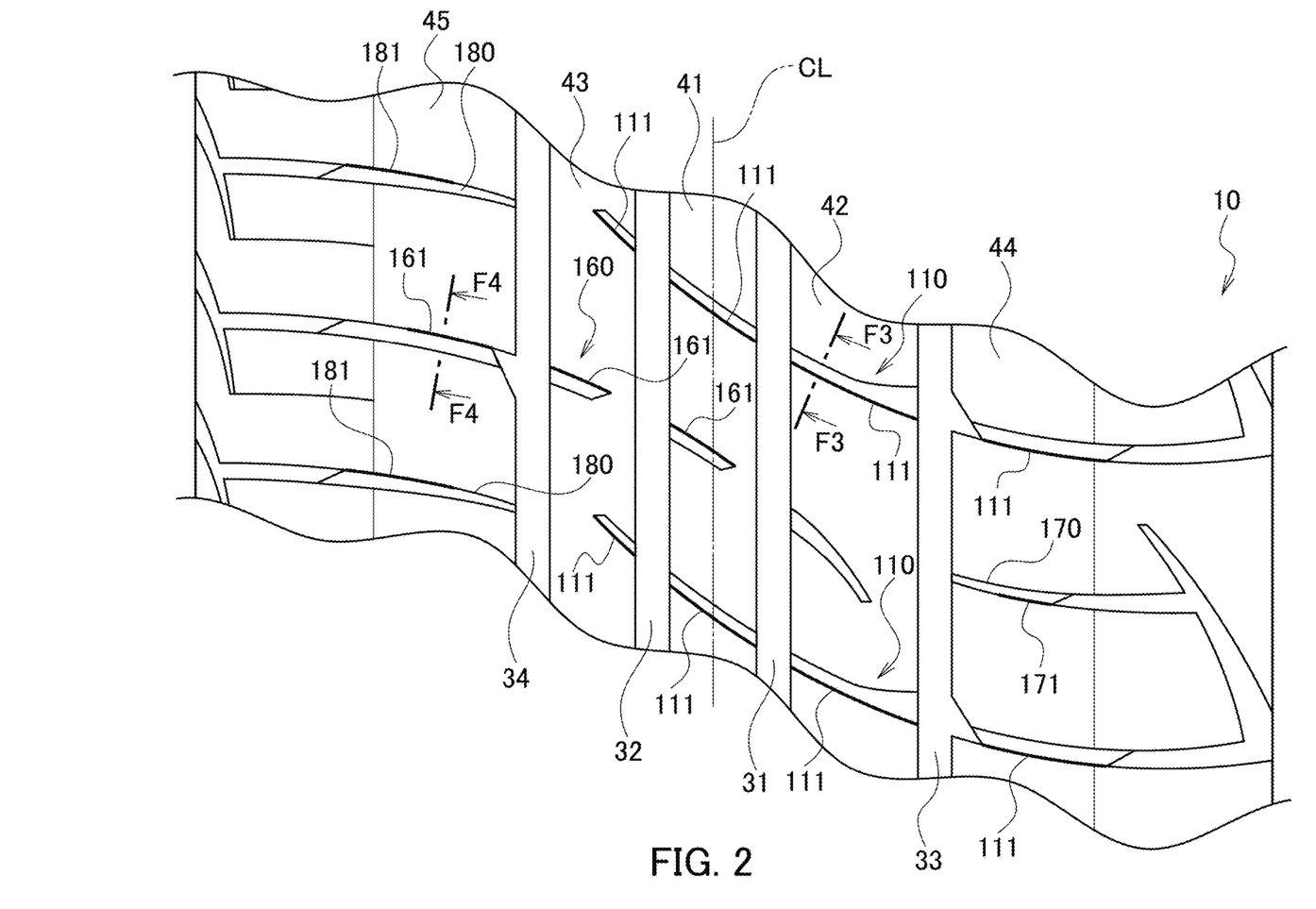
FIG. 2 is an enlarged plan view of approximately one pitch formed in a tread 20 of the pneumatic tire 10.

FIG. 2 is an enlarged plan view of approximately one pitch formed on the tread 20 of the pneumatic tire 10. FIG. 3 is a sectional view taken along the line F3-F3 shown in FIG. 2. FIG. 4 is a sectional view taken along the line F4-F4 shown in FIG. 2.

Figure 3:
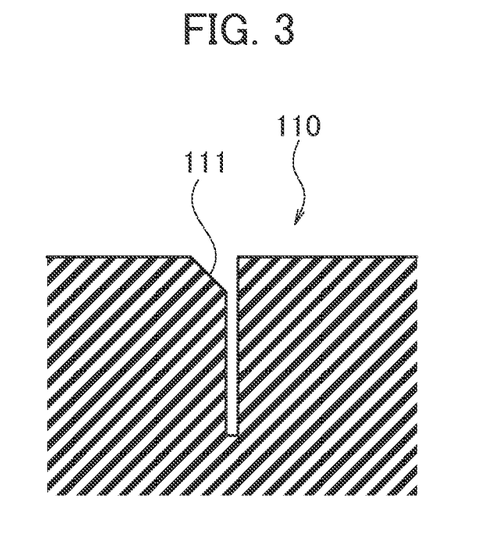
FIG. 3 is a cross-sectional view taken along the line F3-F3 shown in FIG. 2.
Figure 4:
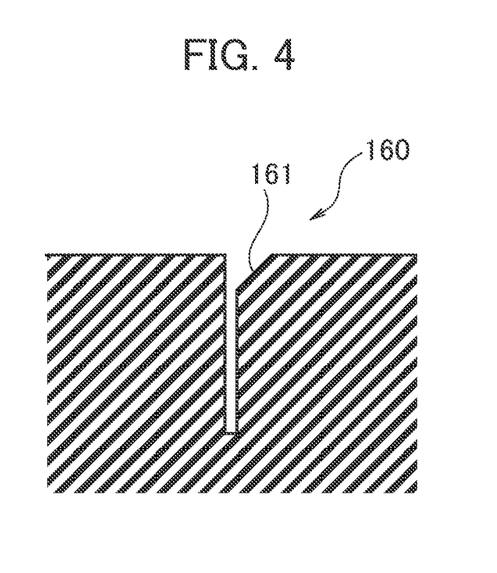
FIG. 4 is a cross-sectional view taken along line F4-F4 shown in FIG. 2.

As shown in FIGS. 2 to 4, a first inclined portion 111 is formed in the first lateral groove 110. The first inclined portion 111 is a flat inclined surface formed by cutting off one end portion in the tire circumferential direction of the circumferential block 41 to the circumferential block 43 and the shoulder block 44 defined by the first lateral groove 110. However, the inclined surface may not necessarily be flat. For example, the sectional shape of the inclined surface (FIG. 3) may be a convex shape or a dome shape, such as a slightly raised shape.

Similarly, a second inclined portion 161 is formed in the second lateral groove 160. The second inclined portion 161 is a flat inclined surface formed by cutting off one end portion in the tire circumferential direction of the circumferential block 41, the circumferential block 43, and the shoulder block 45 (excluding the circumferential block 42) partitioned by the second lateral groove 160.

The first inclined portion 111 and the second inclined portion 161 may be referred to as chamfers or notches.

Specifically, the first inclined portion 111 is formed on one side of the first lateral groove 110 in the tire circumferential direction. On the other hand, the second inclined portion 161 is formed on the other side of the second lateral groove 160 in the tire circumferential direction.

The first inclined portion 111 is inclined from tire radial direction outside to tire radial direction inside by chamfering the end portion of the circumferential block 41 to the circumferential block 43 (and the shoulder block 44) on one side in the tire circumferential direction.

The second inclined portion 161 is inclined from tire radial direction outside to tire radial direction inside by chamfering the end portion of the other circumferential block 41 to the circumferential block 43 (and shoulder block 45, excluding the circumferential block 42) in the tire circumferential direction.

The first inclined portion 111 crosses the circumferential block 41 and the circumferential block 42 and communicates with the circumferential groove 31 to the circumferential groove 33. The first inclined portion 111 is formed over the entire first lateral groove 110 in the circumferential block 41 to the circumferential block 43.

Similarly, the first inclined portion 111 is formed over the entire first lateral groove 110 in the shoulder block 44.

On the other hand, one end of the second inclined portion 161 in the tire width direction terminates in the circumferential block 41 and the circumferential block 43, respectively. Specifically, the second inclined portion 161 communicates with the circumferential groove of inside when mounted to the vehicle, but does not communicate with the circumferential groove of outside when mounted to the vehicle.

The second inclined portion 161 terminates in the second lateral groove 160 in the shoulder block 45. That is, the second inclined portion 161 formed in the shoulder block 45 does not communicate with the circumferential groove 34.

A first inclined part 171 is formed in the first lateral groove 170. A second inclined portion 181 is formed in the second lateral groove 180.

The first inclined portion 171 terminates in the first lateral groove 170 in the shoulder block 44. The second inclined portion 181 terminates in the second lateral groove 180 in the shoulder block 45.

A part of the second lateral groove 160 formed in the shoulder block 45 (inside shoulder block) and the second lateral groove 180 are formed by a configuration in which a second inclined portion 181 is formed on the shoulder side and a configuration in which a second inclined portion 161 is formed on the tire equatorial line CL side, and the configuration is alternatively repeated in the tire circumferential direction.

In the present embodiment, the groove width of the first lateral groove 110 in the tire circumferential direction becomes narrower toward inside when mounted to the vehicle. Similarly, the second lateral groove 160 becomes narrower in the groove width in the tire circumferential direction toward outside when mounted to the vehicle.

(3) Shape of the First Inclined Portion and the Second Inclined Portion

Next, detailed shapes of the first inclined portion 111 formed in the first lateral groove 110 and the second inclined portion 161 formed in the second lateral groove 160 will be described. The shapes of the first inclined portion 171 formed in the first lateral groove 170 and the second inclined portion 181 formed in the second lateral groove 180 are also the same.

Figure 5:
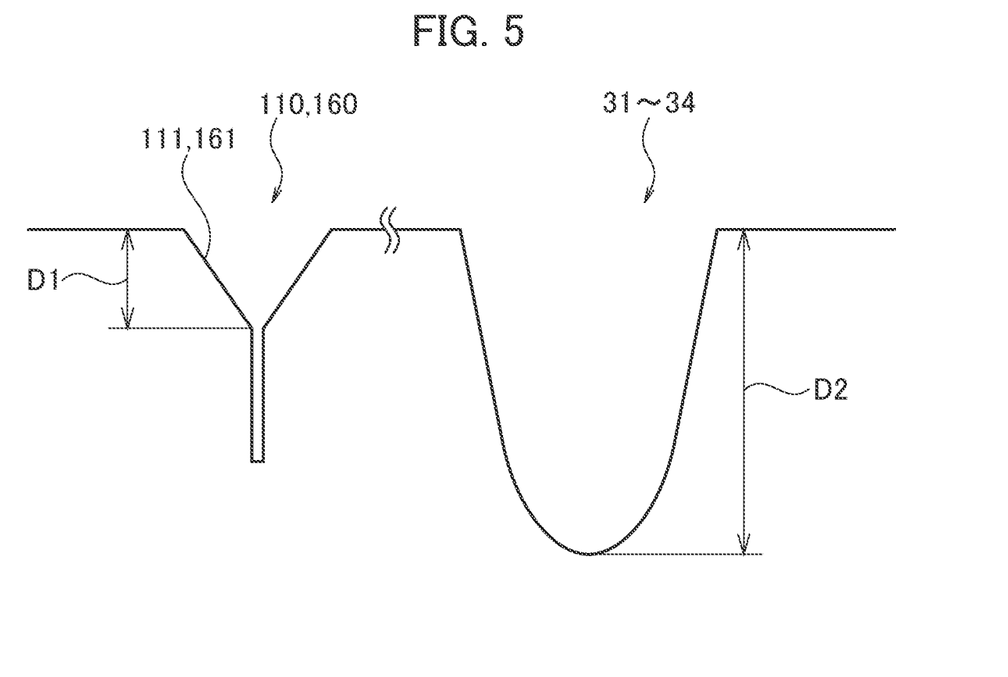
FIG. 5 schematically shows the cross-sectional shapes of a first lateral groove 110 and a second lateral groove 160, and the cross-sectional shapes of the circumferential groove 31 to the circumferential groove 34.

FIG. 5 schematically shows the cross-sectional shapes of the first lateral groove 110 and the second lateral groove 160, and the cross-sectional shapes of the circumferential groove 31 to the circumferential groove 34.

The groove depth D1 of the first lateral groove 110 and the second lateral groove 160 and the groove depth D2 of the circumferential groove 31 to the circumferential groove 34 shown in FIG. 5 preferably satisfy the relation of $10\% \leq (D1/D2) \leq 50\%$.

When D1/D2 is less than 10%, the amount of drainage by the portion cut by the first inclined portion 111 and the second inclined portion 161 (chamfer) decreases, and braking performance on the wet road surface does not improve.

On the other hand, when D1/D2 exceeds 50%, rigidity of the circumferential block decreases, and steering stability does not improve.

Figure 6:
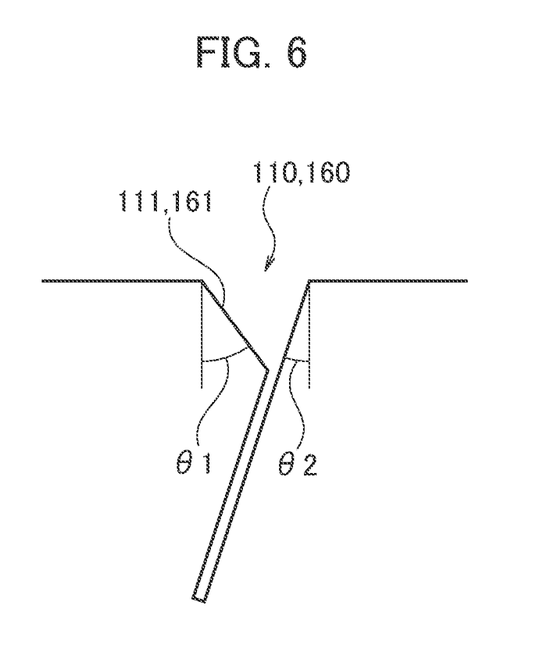
FIG. 6 schematically shows the cross-sectional shapes of the first lateral groove 110 and the second lateral groove 160.

FIG. 6 schematically shows the cross-sectional shapes of the first lateral groove 110 and the second lateral groove 160. FIG. 6 shows an example in which the extending direction of the first lateral groove 110 and the second lateral groove 160 is inclined with respect to tire radial direction, but as shown in FIG. 5, the extending direction of the first lateral groove 110 and the second lateral groove 160 may be substantially parallel to tire radial direction.

As shown in FIG. 6, it is preferable that the angle θ1 of the circumferential block on the side where the first inclined portion 111 and the second inclined portion 161 are formed, and the angle θ2 of the circumferential block on the side where the first inclined portion 111 and the second inclined portion 161 are not formed satisfy the relation of 20°≤θ1≤80°, 0°<θ2<20°, and θ2<θ1.

When θ1 is less than 20°, the edge of the circumferential block deforms so as to be turned when stepping on the road surface or kicking off from the road surface, and the grounding property is lowered. Therefore, the braking performance on the wet road surface does not improve.

On the other hand, when θ1 exceeds 80°, the amount of drainage by the portion cut by the first inclined portion 111 and the second inclined portion 161 (chamfer) decreases, and the braking performance on the wet road surface does not improve.

When θ2 is 0° (perpendicular), the edge pressure at the edge of the circumferential block increases excessively, and cracks or the like are likely to occur.

On the other hand, when θ2 is 20° or more, in order to secure a constant groove depth, it is necessary to lengthen the first lateral groove 110 and the second lateral groove 160 in the depth direction, thereby reducing the rigidity of the circumferential block. This prevents steering stability from improving.

If the relation θ2<θ1 is not satisfied, a notch (chamfer) of a sufficient size cannot be formed, and braking performance on a wet road surface is not improved.

(4) Function and Effects

Next, the function and effect of the pneumatic tire 10 will be described. Specifically, in the pneumatic tire 10, the first inclined portion 111 is formed on one side of the first lateral groove 110 in the tire circumferential direction, and the second inclined portion 161 is formed on the other side of the second lateral groove 160 in the tire circumferential direction.

The first inclined portion 111 is inclined from tire radial direction outside to tire radial direction inside by chamfering the end of one side circumferential block in the tire circumferential direction, and the second inclined portion 161 is inclined from tire radial direction outside to tire radial direction inside by chamfering the end of the other side circumferential block in the tire circumferential direction.

Further, the first inclined portion 111 crosses the circumferential block and communicates with the circumferential groove. On the other hand, one end of the second inclined portion 161 in the tire width direction terminates in the circumferential block.

Therefore, since the notches (chamfers) are formed at the ends of the circumferential blocks in the tire circumferential direction by the first inclined portion 111 and the second inclined portion 161, the edge effect on the wet road surface is particularly easy to be exerted.

One end of the second inclined portion 161 extending in the tire width direction from inside when mounted to the vehicle terminates in the circumferential block. Further, the second inclined portion 161 terminates in the second lateral groove 160 in the shoulder block 45.

Therefore, the rigidity of the inside circumferential block can be secured when mounted to the vehicle, and in particular, steering stability (linearity and initial responsiveness) can be improved when the vehicle travels straight ahead. Such a configuration also contributes to the improvement of wear resistance.

The first inclined portion 111 extending in the tire width direction from outside when mounted to the vehicle crosses the circumferential block. Further, in this embodiment, the first inclined portion 111 is formed over the entire first lateral groove 110 in the shoulder block 44.

Therefore, it contributes to lateral force generation in cornering, and can improve steering stability (initial response, rise of cornering force) in cornering.

Further, the first lateral groove 110 in which the end of one side circumferential direction block in the tire circumferential direction is chamfered and the second lateral groove 160 in which the end of the other side circumferential direction block in the tire circumferential direction is chamfered are formed. Further, in this embodiment, the first lateral grooves 110 and the second lateral grooves 160 are formed alternately in the tire circumferential direction. Therefore, the same performance can be demonstrated regardless of the rotational direction of the pneumatic tire 10.

That is, according to the pneumatic tire 10, it is not necessary to use a tread rubber having a large hysteresis loss especially for improving braking performance on a wet road surface. That is, according to the pneumatic tire 10, steering stability and the wet performance, particularly the braking performance on the wet road surface, can be made compatible while suppressing the rolling resistance.

It has also been found that when the 100% modulus of tread rubber is less than 1.6, fuel economy and braking performance deteriorate. On the other hand, when the 100% modulus of the tread rubber is larger than 2.2, the braking performance is deteriorated.

That is, in the tread pattern of the pneumatic tire 10, when rubber having a 100% modulus of the tread rubber of 1.6 or more and 2.2 or less is adopted, fuel consumption performance and braking performance can be made compatible.

In the present embodiment, part of the second lateral groove 160 formed in the shoulder block 45 (inside shoulder block) and the second lateral groove 180 are alternately repeated in the tire circumferential direction with the configuration in which a second inclined portion 181 is formed on the shoulder side and the configuration in which the second inclined portion 161 is formed on the tire equatorial line CL side.

Therefore, the braking performance can be improved by the edge effect on the wet road surface while securing the rigidity of the inside circumferential block when mounted to the vehicle.

In this embodiment, the first lateral groove 110 is curved to convex to one side in the tire circumferential direction, and the second lateral groove 160 is curved to convex to the other side in the tire circumferential direction.

Therefore, a curved notch (chamfer) can be formed to oppose the braking force regardless of the rotational direction of the pneumatic tire 10. Thus, braking performance on the wet road surface can be further improved.

In this embodiment, the first lateral groove 110 and the second lateral groove 160 extend up to the center region including the tire equatorial line CL. Therefore, since the edge component in the center region is improved, the braking performance on the wet road surface can be further improved. Such a configuration also contributes to the reduction of pitch noise.

In this embodiment, the first lateral groove 110 widens in the tire circumferential direction toward outside when mounted to the vehicle, and the second lateral groove 160 widens in the tire circumferential direction toward outside when mounted to the vehicle.

This contributes to the acceleration of drainage to the shoulder side of the pneumatic tire 10. Thus, braking performance on the wet road surface can be further improved.

(5) Other Embodiments

Although the contents of the present invention have been described above in accordance with the embodiments, the present invention is not limited to these descriptions, and it is obvious to those skilled in the art that various modifications and improvements are possible.

Figure 7:
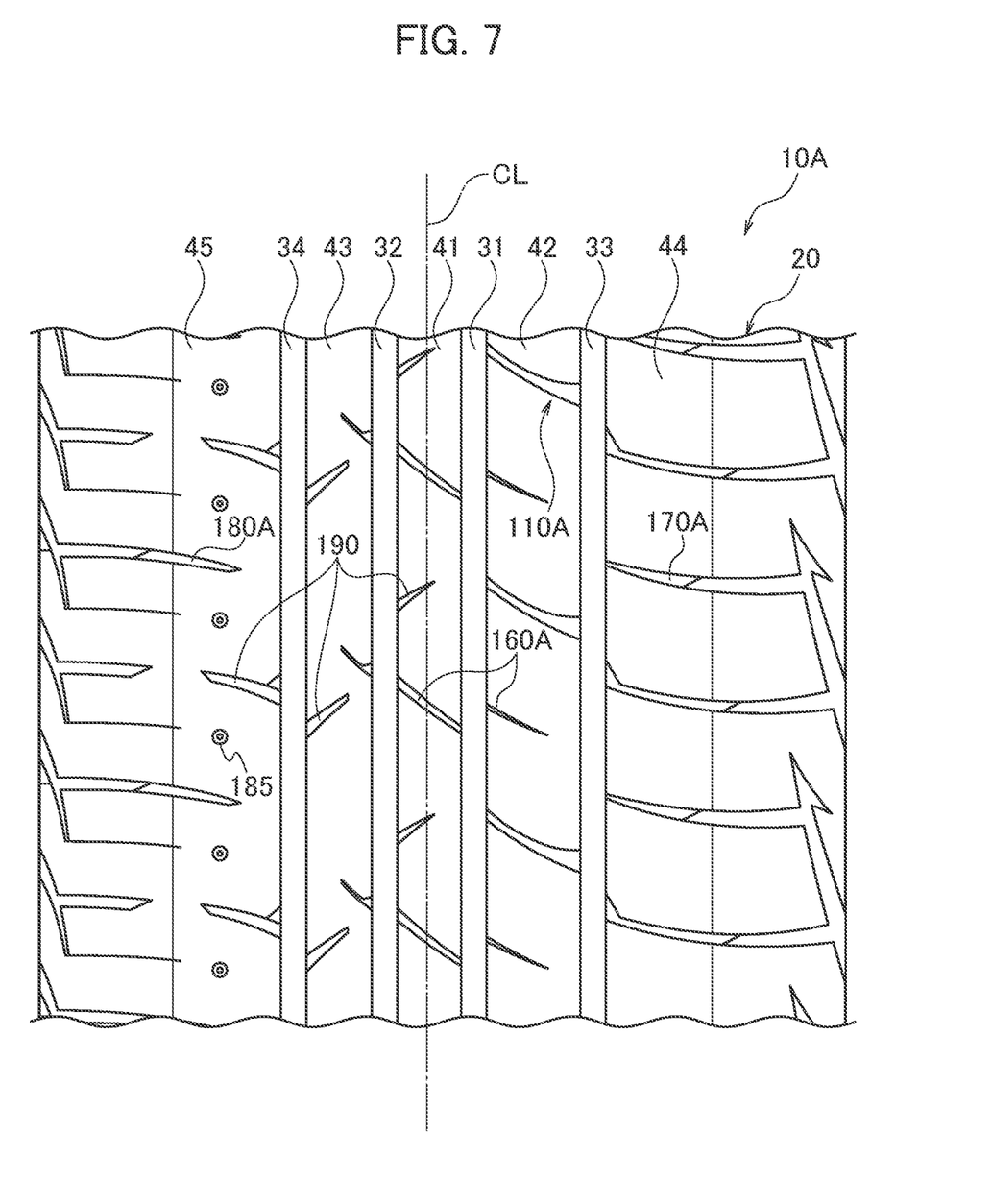
FIG. 7 is a partial plan view of a tread of a pneumatic tire 10A according to a modified example 1.
Figure 8:
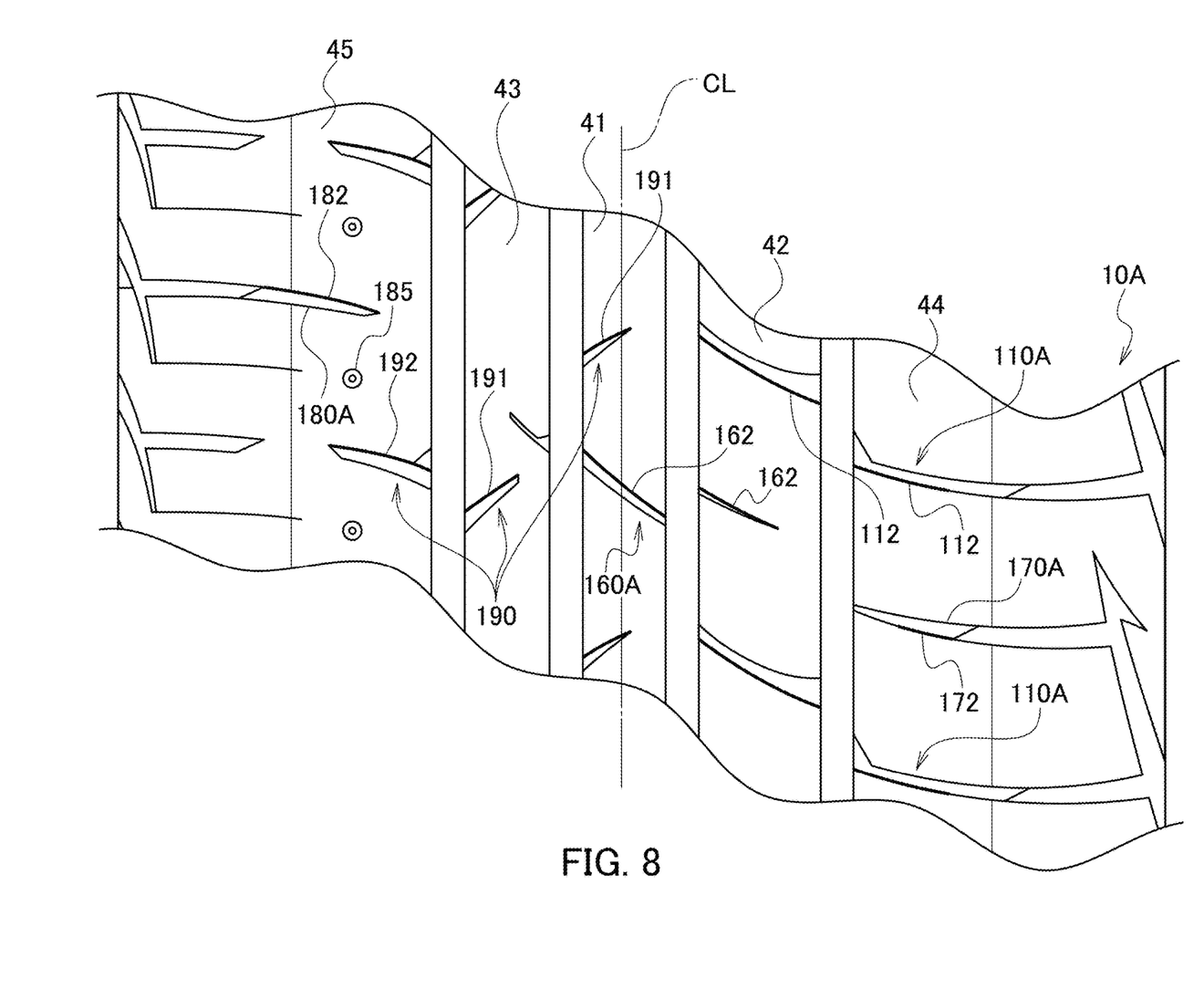
FIG. 8 is an enlarged plan view of approximately one pitch formed in a tread 20 of the pneumatic tire 10A.

For example, the pneumatic tire 10 described above may be modified as follows. FIG. 7 is a partial plan view of a tread of a pneumatic tire 10A according to modified example 1. FIG. 8 is an enlarged plan view of approximately one pitch formed on the tread 20 of the pneumatic tire 10A.

Hereinafter, parts different from the pneumatic tire 10 will be mainly described, and the same parts will be omitted.

As shown in FIGS. 7 and 8, in the tread 20 of the pneumatic tire 10A, a first lateral groove 110A, a second lateral groove 160A, a first lateral groove 170A, a second lateral groove 180A, a pinhole sipe 185 and a second lateral groove 190 are formed.

The first lateral groove 110A, the second lateral groove 160A, the first lateral groove 170A and the second lateral groove 180A correspond to the first lateral groove 110, the second lateral groove 160, the first lateral groove 170 and the second lateral groove 180 of the pneumatic tire 10, respectively.

The pinhole sipe 185 is formed in the shoulder block 45 and is a pinhole-like sipe extending to inside in the tire radial direction.

Similar to the second lateral groove 160A, the second lateral groove 190 extends in the tire width direction from inside when mounted to the vehicle, except for part, and also extends in the direction intersecting the second lateral groove 160A.

As shown in FIG. 8, a first inclined portion 112 is formed in the first lateral groove 110A. A second inclined portion 162 is formed in the second lateral groove 160A, and a second inclined portion 182 is formed in the second lateral groove 180A.

Further, a second inclined portion 191 and a second inclined portion 192 are formed in the second lateral groove 190. The second inclined portion 191 is formed in a portion extending in a direction crossing the second lateral groove 160A, and the second inclined portion 192 is formed in a portion extending in a direction not crossing the second lateral groove 160A.

Like the second inclined portion 162, the second inclined portion 191 and the second inclined portion 192 are formed on the other side (upper side in FIG. 8) in the tire circumferential direction.

The pneumatic tire 10A can be suitably used for an SUV (RV) having a heavy vehicle weight in comparison with the pneumatic tire 10. By replacing part of the lateral groove formed in the shoulder block 45 (inside shoulder block) with the pinhole sipe 185, wear resistance of the inside shoulder block can be secured even when mounted on an SUV (RV) having a heavy vehicle weight.

Figure 9:
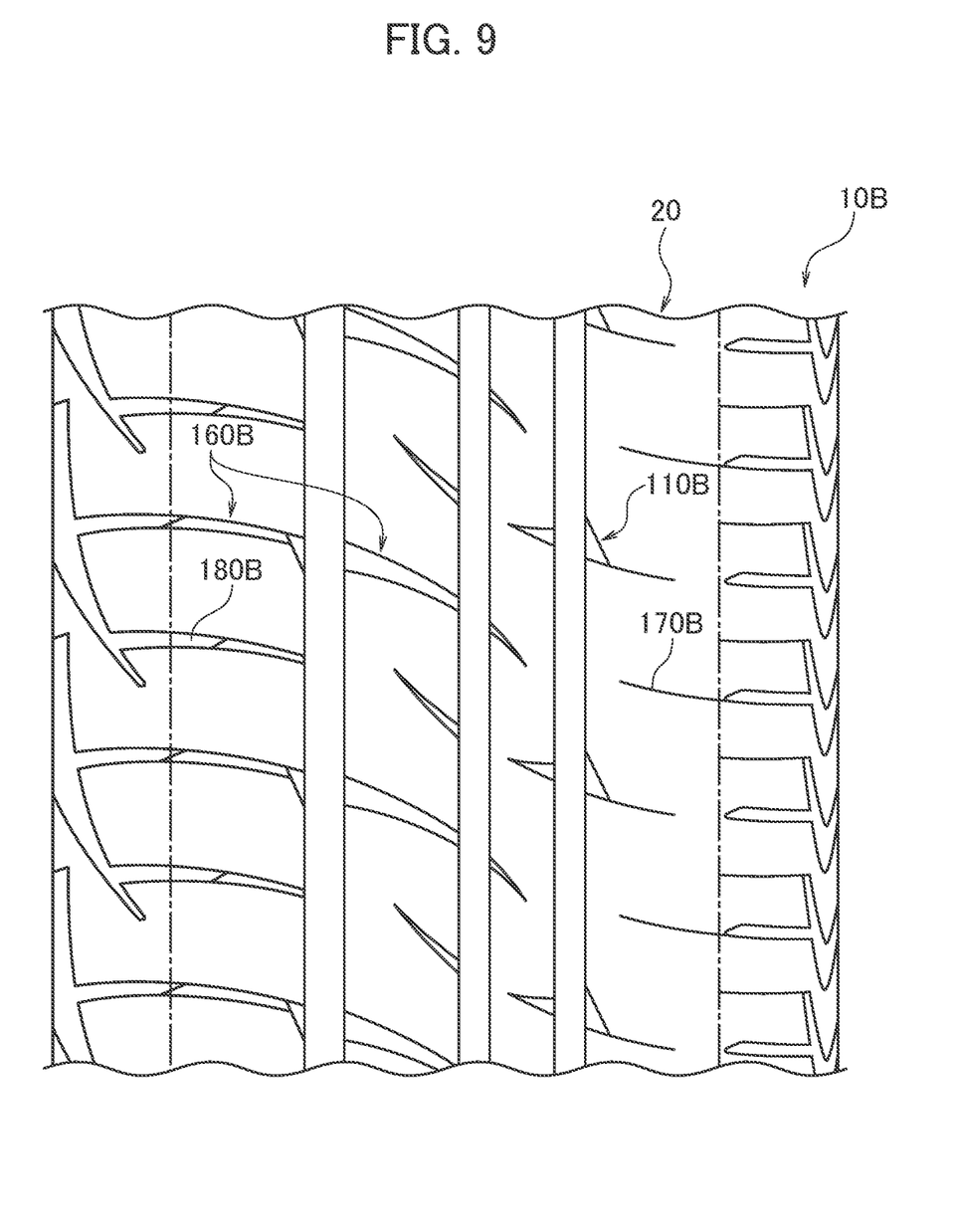
FIG. 9 is a partial plan view of a tread of a pneumatic tire 10B according to a modified example 2.

FIG. 9 is a partial plan view of the tread of a pneumatic tire 10B according to a modified example 2. As shown in FIG. 9, the pneumatic tire 10B is similar to the tread pattern of the pneumatic tire 10 described above, but the shapes of the first lateral groove 110B, the second lateral groove 160B and the first lateral groove 170B are slightly different from those of the first lateral groove 110, the second lateral groove 160 and the first lateral groove 170. On the other hand, the shape of the second lateral groove 180B is the same as that of the second lateral groove 180.

The number of circumferential blocks formed in the tread 20 of the pneumatic tire 10B is smaller than that of the pneumatic tire 10.

Despite these differences, the pneumatic tire 10B can exhibit performance equivalent to that of the pneumatic tire 10. In particular, by forming the first lateral groove and the second lateral groove while reducing the number of circumferential blocks, it can be suitably used for a light automobile (engine displacement 660 cc or less) having a narrow tread width (tire width) and light vehicle weight and a compact car. The term compact car as used herein may be used in comparison for a medium or large vehicle to which the pneumatic tire 10 is to be mounted. In particular, vehicles subject to registration other than the light automobile may be covered.

In the pneumatic tire 10 described above, the first lateral groove 110 is also formed in the shoulder block 44, and the second lateral groove 160 is also formed in the shoulder block 45, but the first lateral groove 110 and the second lateral groove 160 may not necessarily be formed in the shoulder block.

As noted above, embodiments of the invention have been described, but it should not be understood that the statements and drawings that make up part of this disclosure limit the invention. Various alternative embodiments, embodiments and operational techniques will become apparent to those skilled in the art from this disclosure.

REFERENCE SIGNS LIST 10, 10A, 10B pneumatic tire
20 tread
31~34 circumferential groove
41~43 circumferential block
44, 45 shoulder Block
110, 110A first lateral groove
111, 112 first inclined portion
160, 160A, 160B second lateral groove
161, 162 second inclined portion
170, 170A, 170B first lateral groove
171 first inclined portion
180, 180A, 180B second lateral groove
181, 182 second inclined portion
185 pin hole sipe
190 second lateral groove
191, 192 second inclined portion

The invention claimed is:

1. A tire having a plurality of circumferential blocks, an inside shoulder block and an outside shoulder block divided by a plurality of circumferential grooves extending in a tire circumferential direction, with the plurality of circumferential blocks located between the inside shoulder block and the outside shoulder block, further comprising:
a plurality of first lateral grooves extending in a tire width direction from an outside of the tire when the tire is mounted to a vehicle;
a first plurality of second lateral grooves extending in the tire width direction from an inside of the tire when the tire is mounted to the vehicle; and
a second plurality of second lateral grooves extending in the tire width direction towards an inside axial end of the tire when the tire is mounted to the vehicle, wherein
a first inclined portion is formed exclusively on a one side of the plurality of first lateral grooves in the tire circumferential direction, thus forming a plurality of first inclined portions,
a second inclined portion is formed exclusively on an other side of both the first plurality and the second plurality of the plurality of second lateral grooves in the tire circumferential direction, thus forming a plurality of second inclined portions, the other side being in an opposite circumferential direction of the one side,
the plurality of first inclined portions are inclined from an outside of a tire radial direction to an inside of the tire radial direction by chamfering an end portion on the one side in the tire circumferential direction,
the plurality of second inclined portions are inclined from the outside of the tire radial direction to the inside of the tire radial direction by chamfering an end portion on the other side in the tire circumferential direction,
at least one first inclined portion of the plurality of first inclined portions of the first lateral grooves provided in one circumferential block of the plurality of circumferential blocks crosses the one circumferential block and communicates with two circumferential grooves of the plurality of circumferential grooves that are adjacent to the one circumferential block,
one end portion of at least one second inclined portion of the plurality of second inclined portions in the tire width direction of at least one second lateral groove of the second plurality of second lateral grooves provided in one circumferential block of the plurality of circumferential blocks terminates in the one circumferential block of the plurality of circumferential blocks,
at least one first lateral groove of the plurality of first lateral grooves is at least partly formed in the outside shoulder block,
at least one second lateral groove of the first plurality of second lateral grooves and at least one second lateral groove of the second plurality of second lateral grooves are at least partly formed in the inside shoulder block,
at least one second inclined portion of the plurality of second inclined portions terminate in a second lateral groove of the first plurality of second lateral grooves and at least one second lateral groove of the second plurality of second lateral grooves in the inside shoulder block,
at least one second lateral groove of the first plurality of second lateral grooves formed in the inside shoulder block is formed by:
a first configuration in which a second inclined portion of the plurality of second inclined portions is formed only on a shoulder side of a second lateral groove of the first plurality of second lateral grooves,
at least one second lateral groove of the second plurality of second lateral grooves formed in the inside shoulder block is formed by:
a second configuration in which a second inclined portion of the plurality of second inclined portions is formed only on a tire equatorial line side of a second lateral groove of the second plurality of second lateral grooves, and
the first configuration and the second configuration are alternately repeated in the tire circumferential direction.

2. The tire according to claim 1, wherein the plurality of first lateral grooves and the plurality of second lateral grooves are formed alternately in the tire circumferential direction.

3. The tire according to claim 1, wherein,
the plurality of first lateral grooves are curved to convex to the one side in the tire circumferential direction, and
the plurality of second lateral grooves are curved to convex to the other side in the tire circumferential direction.

4. The tire according to claim 1, wherein at least one first lateral groove of the plurality of first lateral grooves and at least one second lateral groove of the second plurality of second lateral grooves extend to a center region including a tire equatorial line, the center region being a region including the tire equatorial line and the plurality of circumferential blocks.

5. The tire according to claim 1, wherein
the plurality of first lateral grooves widen in the tire circumferential direction toward outside when the tire is mounted to the vehicle, and
the second plurality of second lateral grooves widen in the tire circumferential direction toward inside when the tire is mounted to the vehicle.

6. The tire according to claim 1, wherein the inside shoulder block has a pinhole-shaped sipe extending to the inside in the tire radial direction.

7. The tire according to claim 2, wherein
the plurality of first inclined portions is formed over the respective entire first lateral grooves in the outside shoulder block, and
the plurality of second inclined portions terminates in the respective second lateral grooves in the inside shoulder block.

8. The tire according to claim 2, wherein,
the plurality of first lateral grooves are curved to convex to the one side in the tire circumferential direction, and
the second plurality of second lateral grooves are curved to convex to the other side in the tire circumferential direction.

9. The tire according to claim 2, wherein at least one first lateral groove of the plurality of first lateral grooves and at least one second lateral groove of the second plurality of second lateral grooves extend to a center region including a tire equatorial line, the center region being a region including the tire equatorial line and the plurality of circumferential blocks.

10. The tire according to claim 3, wherein at least one first lateral groove of the plurality of first lateral grooves and at least one second lateral groove of the second plurality of second lateral grooves extend to a center region including a tire equatorial line, the center region being a region including the tire equatorial line and the plurality of circumferential blocks.

11. The tire according to claim 2, wherein
the plurality of first lateral grooves widen in the tire circumferential direction toward outside when the tire is mounted to the vehicle, and
the second plurality of second lateral grooves widen in the tire circumferential direction toward inside when the tire is mounted to the vehicle.

12. The tire according to claim 3, wherein
the plurality of first lateral grooves widen in the tire circumferential direction toward outside when the tire is mounted to the vehicle, and
the second plurality of second lateral grooves widen in the tire circumferential direction toward inside when the tire is mounted to the vehicle.

\* \* \* \* \*